…

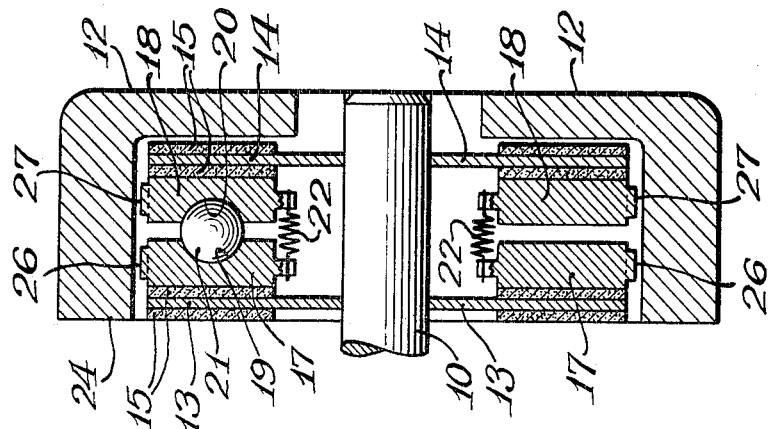
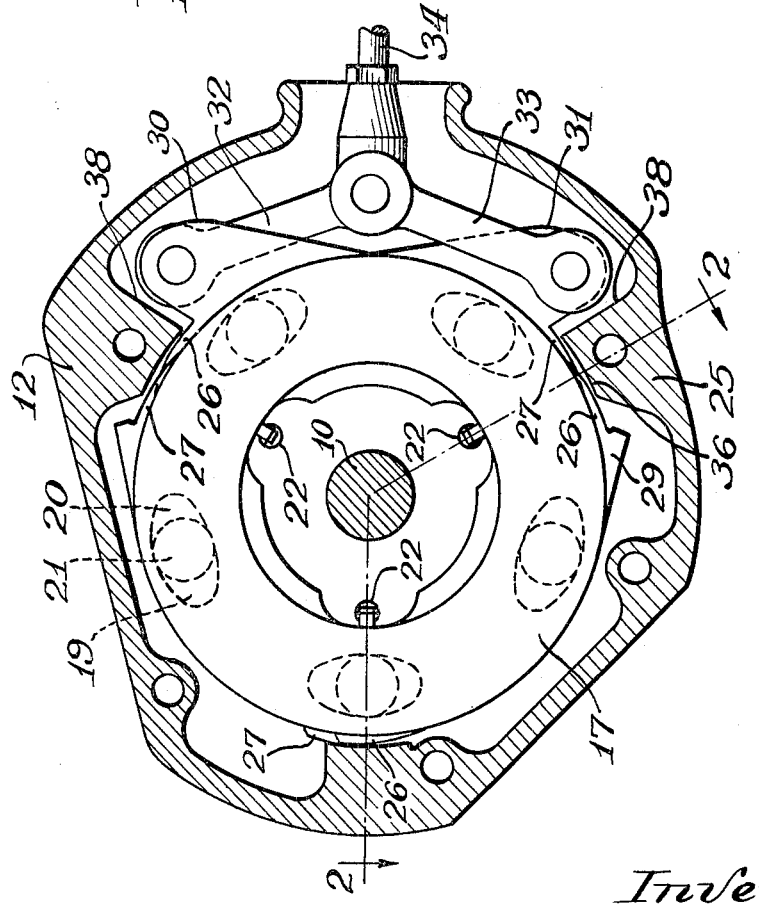

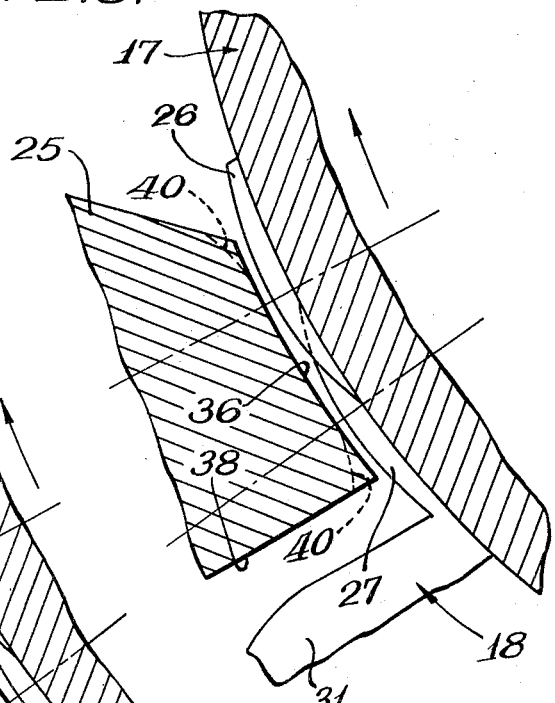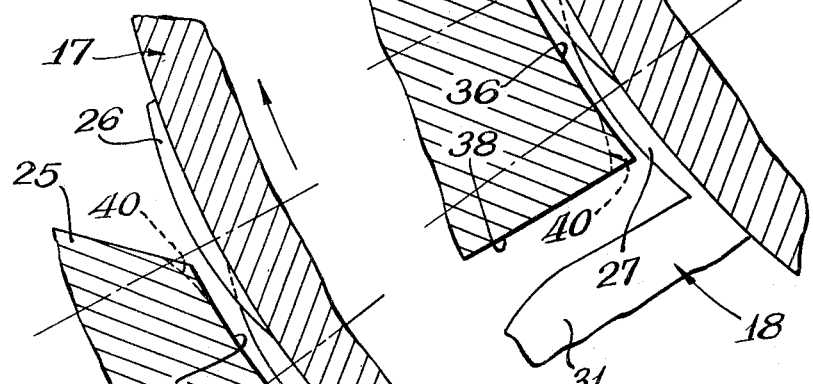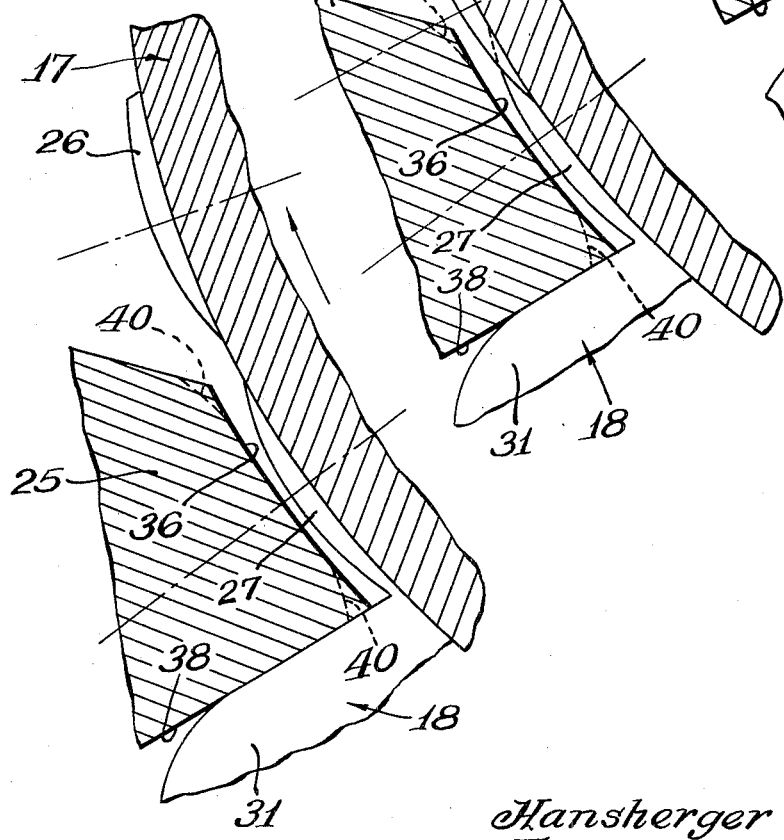

United States Patent Office 3,512,614
Patented May 19, 1970

---

3,512,614
SELF-ENERGIZING DISC BRAKE FOR AUTOMOTIVE VEHICLES
Hansherger Powilleit, Erkrath-Unterbach, and Edmund Dohr, Vorst, Germany, assignors to International Harvester Company, Chicago, Ill., a corporation of Delaware
Filed June 3, 1968, Ser. No. 733,875
Int. Cl. F16d 55/16
U.S. Cl. 188—71.5                                   7 Claims

ABSTRACT OF THE DISCLOSURE

A self-energizing disc brake having a pair of thrust plates positioned within a stationary housing and between brake discs connected to a shaft to be decelerated. An actuating means to rotate the plates relative to each other to cause spherical balls trapped in complementary indentations in the facing surfaces of the plates to push the plates away from each other against the bias of a spring means into frictional engagement with the brake discs. The plates are provided with lugs engageable with projections on the housing to arrest rotation of one of the plates, and with centering cams engageable with guide surfaces formed on the projections. The centering cams and the guide surfaces are arranged so that upon arresting one thrust plate, the cams on the other thrust plate will be substantially beyond the guide surface to avoid contact with that surface in the event there is radial movement of the plates to thereby preclude frictional forces which would detract from the self-energizing effect of the brake.

BACKGROUND AND SUMMARY OF THE INVENTION

This invention relates to disc brakes of the kind in which two cooperating thrust plates are accommodated within a stationary housing in parallel with one another. The thrust plates are located between the brake discs which are connected to a shaft to be decelerated, and balls are located in conical or inclined recesses or depressions in the adjacent faces of the thrust plates. The application of the brake is initiated by rotating the plates relative to each other which causes the balls to urge the plates apart until they are in frictional engagement with the brake discs. The plates then tend to rotate with the rotating members, i.e. the shaft and the brake discs attached thereto, until one plate engages with the stationary projection on the brake housing which holds it against further angular movement while the frictional force imparted to the other plate through its engagement with the brake disc causes continued angular movement of this other plate, which is referred to as the servo plate. This results in still further relative angular movement between the thrust plates causing the balls to urge the plates still further apart and to thereby produce a self-energizing action to apply the brake.

It is common practice to provide in the brake housing angularly spaced pilot lugs, generally three in number and spaced at equal angles around the rotating shaft, extending radially inward to maintain the plates in a central position with respect to the housing, the plates being in sliding engagement with the lugs. The plates also carry radial projections which are engageable with abutment faces on a lug to form a stop for one or the other of the plates according to the direction of rotation of the shaft.

When angular movement of a plate is arrested in the application of the brake, the plate assembly tends to pivot about the stop abutment and the plates are forced against another of the pilot lugs so that axial movement of both plates and axial and angular movement of the energizing plate are impeded. Since this results in a tangential force on the energizing or servo plate in a direction opposite to the rotation of the servo plate, the self-energizing effect is diminished or completely destroyed and a greater effort has to be applied by the operator to the brake pedal.

During the normal operation of disc brakes of the kind described, the braking operation itself affects a centering action between the two thrust plates by means of the expander balls which are located in the recesses on the thrust plates. Consequently, there are two centering actions which may take place; the centering of the thrust plates with respect to one another by means of the balls located in the recesses, and the centering of the thrust plates within the housing by the action of the centering cams. Where there are manufacturing inaccuracies in the diameters of the balls or the recesses in the thrust plates, or inaccuracies in the manufacture of the centering cams on the thrust plates or in relation to the position of the individual center axes of any of these parts, a double centering of the thrust plates at the guide surfaces of the housing projections is involved. That is to say, the centering cams of both thrust plates are acting to effect centering.

Attempts have previously been made to reduce frictional losses which tend to arise as the brakes are actuated. However, the previous solutions have involved inclining the stop surface of the housing projections. Such a solution does not completely eliminate the undesirable frictional losses, and in addition precludes an exact control of the braking effort because of angular inaccuracies in the oblique stop surfaces with the result that there is inevitably uncontrollable changes in the frictional forces.

It is, therefore, an object of the present invention to provide a disc brake of the kind described in which a substantial reduction in undesirable frictional forces is obtained without abandoning a reasonably exact control of the braking effort.

It is also an object of the present invention to provide a disc brake of the kind described wherein a plurality of centering cams are provided on the circumference of each thrust plate, and corresponding projections are provided on the housing, each projection having a stop surface for restricting rotational movement of the thrust plate and a guide surface for engaging the centering cams to effect a centering action on the thrust plates, the arrangement being such that, when the brake is operated and one thrust plate is engaged by a stop surface which is substantially radial to the thrust plates, the centering cam on the thrust plate which is not engaged by the stop surface is brought to rest in a position where the centering cam cannot engage the guide surface of the housing projection. Preferably the housing projections have their guide surfaces which would have been engageable by the nonenergizing plate rounded or cut back at both ends.

These and other objects of the present invention will be more readily apparent upon a perusal of the following description and the accompanying drawings, wherein:

FIG. 1 is a longitudinal section through a disc brake incorporating the invention;

FIG. 2 is a sectional view taken on line 2—2 of FIG. 1, and

FIGS. 3 to 5 show in an enlarged scale various positions of the two thrust plates of the disk brake of FIGS. 1 and 2 during operation of the brake.

Referring to FIGS. 1 and 2, there is shown a disc brake of the kind described which is suitable for installation, for example, in the rear axle housing of a tractor. A shaft 10, which may be the tractor axle, is mounted for rotation within a housing 12, and has a pair of discs 13 and 14 retained on the shaft; each disc having brake linings 15.

Two thrust plates 17 and 18 are located between the brake discs 13 and 14, and opposing complementary recesses 19 and 20 are provided on the inner faces of the thrust plates 17 and 18. Each pair of opposing recesses 19 and 20 contains a spherical ball 21. Thrust plates 17 and 18 are normally drawn toward each other by means of the springs 22, and the recesses containing the balls cause the thrust plates 17 and 18 to be centered with respect to each other. The housing 12 has three equiangularly spaced housing projections or lugs 23, 24 and 25 for guiding the thrust plates 17 and 18. In order to assist this guiding action each of the thrust plates 17 and 18 has on its circumference three corresponding centering cams 26 and 27 respectively. Two of the three housing projections, namely, the housing projections 23 and 25, simultaneously constitute stops for the lugs 30 and 31 respectively formed on the thrust plates 17 and 18. Connected to the lugs 30 and 31 are the outer ends of two toggle levers 32 and 33. The inner ends of the toggles 32 and 33 are pivotally connected to each other and to a pull rod 34. Pull rod 34 extends through the housing 12 and is connected to a brake pedal, not shown on the drawings, for manipulation by the operator.

When the disc brake is operated the brake pedal is depressed so as to direct the pull rod outwardly with respect to the housing 12. The toggle levers 32 and 33 therefore rotate the lugs 30 and 31 toward each other, and thus cause the thrust plates 17 and 18 to turn relative to each other so that the balls 11 run up on the incline of the recesses 19 or 20. Thrust plates 17 and 18 are thereby forced away from one another against the bias of the springs 22. Axial expansion or displacement of the thrust plates 17 and 18 takes place and the actual braking effect is obtained by the thrust plates 17 and 18 engaging with the brake linings 15 on the brake discs 13 and 14.

Relative movement of the two thrust plates 17 and 18 takes place during this braking procedure and this relative movement is shown in FIGS. 3 to 5. Assuming that the shaft 10 to be braked is rotating in the direction of the arrow, then both thrust plates 17 and 18 will initially be moved in the direction of the arrow when the brake engages. As shown in FIG. 3, the centering cam 26 on the above thrust plate 18 and the centering cam 27 on the underneath thrust plate 17 are both essentially within the range of the guide surface 36 of the housing projections. That is, the cams have a substantial portion of their arc lengths radially inward of the arc length of the guide surface 36, and, of more significance, the maximum radially height of the cams is below the guide surface. As soon as the brake is actuated the lug 31 of the lower thrust plate 17 is brought against the facing stop surface 38 of the housing projection 36 as is shown in FIG. 4. In this position, the majority of the effective guide surface of centering cam 26 is already outside or beyond the guide surface 36 of the housing projection 25, and the maximum height of the cam 26 is outside the arc length of the guide surface 36, so that frictional engagement of the guide surface 36 with the thrust plate 18, which will continue moving a short distance, is precluded. FIG. 5 illustrates the position of the centering cam 26 when the plate 18 has reached the limit of its movement, wherein it will be clearly seen that the centering cam 26 is completely beyond the guide surface 36.

The disc brake according to the present invention is constructed to operate in this manner. However, in the event of manufacturing tolerances or other discrepancies, frictional engagement can be entirely avoided by making the guide surfaces 36 of the housing projections 23 and 25 rounded or cut back in those areas directly above, or radially outward of, the thrust plate 18, such as illustrated at 40 in FIGS. 3, 4 and 5.

The opposite housing projections 23, as well as the cams 26 and 27 on the thrust plates 17 and 18 which coact with the housing projection 23 are designed identically to that described with respect to the projection 25. These component parts would be operable, to function in exactly the same manner, when the shaft is rotating in an opposite direction from that indicated by the arrow in FIGS. 3, 4 and 5.

While one embodiment of the preferred invention has been shown and described in the foregoing specification, it is to be understood that various changes and modifications may be made therein without departing from the spirit of the invention.

What is claimed is:

1. A disc brake of the kind described comprising a housing, a pair of thrust plates, a plurality of centering cams provided on the circumference of each thrust plate, and corresponding projections provided on the housing, each projection having a stop surface for restricting rotational movement of the thrust plate and a guide surface for engaging the centering cams to effect a centering action on the thrust plates, the arrangement being such that, when the brake is operated and one thrust plate is engaged by a stop surface which is substantially radial to the thrust plates, the centering cams on the thrust plate which is not engaged by the stop surface are brought to rest in positions where the centering cams cannot engage the guide surfaces of the housing projections.

2. A disc brake according to claim 1, wherein the housing projections are rounded or cut back at both ends of their guide surfaces.

3. In a self-energizing disk brake for decelerating a shaft rotatable in a given direction within a housing, the brake having a pair of thrust plates positioned within the housing between a pair of discs retained on the shaft, said plates being urged axially outward into frictional engagement with the discs in response to angular displacement of the thrust plates relative to each other, the improvement comprising:
   at least one projection formed on the interior of the housing;
   a plurality of guide surfaces formed on the interior of the housing;
   a radially extending boss on one of the thrust plates and engageable with the projection;
   a plurality of centering cams formed on the periphery of both thrust plates and being capable of engaging the guide surfaces to stabilize and prevent floating movement of the plates;
   the cams having an arc length relative to the arc length of the guide surfaces such that when the boss is in contact with the projection of all of the cams on said one plate are entirely within the arc length of the guide surfaces and all of the cams on the other of said plates is substantially outside the arc length of the guide surface, whereby the plates are stabilized solely by contact of the cam on said one plate with the guide surfaces thereby minimizing frictional resistance to further rotation of said other plate relative to said one plate.

4. In a self-energizing disc brake according to claim 3, and further comprising:
   a second boss on said other plate,
   a second projection formed on the interior of the housing and engageable by the second boss when the shaft is rotating opposite to said given direction.

5. In a self-energizing disc brake according to claim 3, wherein the extreme edges of the guide surfaces are directed radially outward.

6. In a self-energizing disc brake according to claim 5, wherein
said bosses and said projections have contact surfaces which extend radially.

7. In a self-energizing disc brake according to claim 6 wherein said second projection is provided with a guide surface having extreme edges that are directed radially outward.

References Cited

UNITED STATES PATENTS 3,204,727  9/1965  Wilson et al. _____ 188—72

GEORGE E. A. HALVOSA, Primary Examiner

U.S. Cl. X.R.

192—70